United States Patent
Rahbar et al.

(10) Patent No.: US 8,971,548 B2
(45) Date of Patent: Mar. 3, 2015

(54) MOTOR NOISE REDUCTION CIRCUIT

(75) Inventors: Kamran Rahbar, Kanata (CA); Dean Morgan, Kanata (CA)

(73) Assignee: Microsemi Semiconductor ULC, Kanata, ON (CA)

(*) Notice: Subject to any disclaimer, the term of this patent is extended or adjusted under 35 U.S.C. 154(b) by 586 days.

(21) Appl. No.: 13/316,902

(22) Filed: Dec. 12, 2011

(65) Prior Publication Data

US 2012/0154610 A1 Jun. 21, 2012

(51) Int. Cl.
| | |
|---|---|
| H04B 15/00 | (2006.01) |
| G03B 31/00 | (2006.01) |
| H04R 3/00 | (2006.01) |
| G10L 21/0264 | (2013.01) |
| G10L 21/0224 | (2013.01) |
| G10L 21/0216 | (2013.01) |

(52) U.S. Cl.
CPC ............... *G03B 31/00* (2013.01); *H04R 3/005* (2013.01); *G10L 21/0264* (2013.01); *H04R 2430/20* (2013.01); *G10L 21/0224* (2013.01); *G10L 2021/02166* (2013.01)
USPC ......................................... 381/94.1; 381/71.1

(58) Field of Classification Search
USPC ........... 381/94.1, 95, 71.1, 71.11, 71.12, 122, 381/66, 83, 93; 700/94, 28, 55; 348/E5.024, 348/207.99; 379/3, 406.01, 406.05
See application file for complete search history.

(56) References Cited

U.S. PATENT DOCUMENTS

| | | | | |
|---|---|---|---|---|
| 5,561,598 | A | * | 10/1996 | Nowak et al. .................... 700/55 |
| 2002/0118841 | A1 | * | 8/2002 | Button et al. .................... 381/55 |
| 2002/0126856 | A1 | * | 9/2002 | Krasny et al. ................. 381/94.1 |
| 2005/0008170 | A1 | * | 1/2005 | Pfaffinger et al. ............... 381/96 |
| 2005/0063553 | A1 | * | 3/2005 | Ozawa ............................ 381/92 |
| 2005/0147025 | A1 | * | 7/2005 | Auer ............................. 370/203 |
| 2009/0214054 | A1 | * | 8/2009 | Fujii et al. .................... 381/94.1 |
| 2010/0241428 | A1 | * | 9/2010 | Yiu ............................... 704/233 |

* cited by examiner

*Primary Examiner* — Vivian Chin
*Assistant Examiner* — Friedrich W Fahnert
(74) *Attorney, Agent, or Firm* — Marks & Clerk

(57) ABSTRACT

A method of reducing noise in an environment where the noise source is in a fixed location relative to a pair of microphones, such as in a camera with a zoom motor, involves receiving signals $x_1(t)$, $x_2(t)$ from the respective microphones, and filtering each of the signals $x_1(t)$, $x_2(t)$ with respective first and second linear filters having filter coefficients obtained by computing eigenfilters corresponding to data samples from the respective microphones for noise only and signal only conditions.

12 Claims, 2 Drawing Sheets

MOTOR NOISE REDUCTION CIRCUIT

FIELD OF THE INVENTION

This invention relates to the field of digital signal processing, and in particular to a method and apparatus for the reduction of noise in an environment having a fixed noise source, such as a camera zoom lens motor.

BACKGROUND OF THE INVENTION

In digital cameras with video recording capability, one of the desired features is the ability to zoom and focus while video recording. Most cameras with this built-in feature suffer from the problem of the user hearing the sound of the zoom motor picked up by on-camera microphones.

FIG. 1 is a simple block diagram of the camera where Mic1 and Mic2 are the two microphones used on the camera for audio stereo recording, S1 represents the desired voice or audio signal that should be recorded by the camera with minimum distortion and S2 represents the audio noise generated by the zoom or lens focus motor. Also in this figure, $h_{21}$ and $h_{22}$ represent the acoustic paths between the motor and the two microphones. Due to the small size of video cameras, the motor will be in close proximity of the two microphones and as a result most of the noise generated by zoom or focus motors will be picked up by the two microphones. To most users this noise is annoying and desirably should be eliminated.

A rather expensive way of achieving this result is to use quieter zoom and focus motors. This may not be a cost effective solution, especially for low cost cameras. Another approach to this problem is to remove the noise by performing digital signal processing on the microphone signals.

In most cameras the audio signals from the microphones signals are digitized using analog to digital (A/D) converters and processed by an embedded processor, which may also compress the recorded audio signals before saving them into a flash memory.

A signal processing algorithm for removing the motor noise from input audio signal can be made part of the software running on the camera processor, ideally before audio compression stage. This solution can be very cost effective since it only requires a software upgrade rather than modification to expensive hardware.

Although very cost effective, removing camera motor noise through digital processing of the microphone signals is a non-trivial task. The main challenge is that removing the motor noise should not distort input audio signal. Camera zoom motor noise is wideband and quasi stationary in nature, and it shares same frequency bands with the input audio signal itself. As a result, such noise cannot be eliminated using traditional DSP filtering techniques (e.g. lowpass filtering, notch filter etc.). Also single microphone noise reduction methods which rely on subtracting noise spectrum from the input signal spectrum are not very attractive since they tend to distort the original audio signal. To make matters worse, the spectrum of motor noise may change with time. This can affect the performance of the algorithms that mainly rely on a stationary noise assumption.

Other approaches such as beamfoming and active noise control (ANC) have their own limitations. For example, for beamforming the geometry and number of microphones and their location affects the output performance. Also beamforming or similar approaches may require a greater number of microphones (more than two) which may not feasible on a small camera body. In addition, these methods are usually computationaly expensive to implement.

SUMMARY OF THE INVENTION

Embodiments of the invention employ a novel two microphone noise reduction scheme that e.g. can be used in cameras to reduce noise due to camera's zoom and focus motors. Such embodiments use the signals from the two microphones available on most cameras for stereo recording of the audio signal. They take advantage of the fact that noise source (in this case the zoom or focus motor) is fixed with respect to the two microphones so the acoustic paths between the noise source and the two microphones can be assumed almost constant.

Thus, according to the present invention there is provided a method of reducing noise in an environment where the noise source is in a fixed location relative to a pair of microphones, comprising receiving signals $x_1(t)$, $x_2(t)$ from the respective microphones; and filtering each of the signals $x_1(t)$, $x_2(t)$ with respective first and second linear filters having filter coefficients obtained by computing eigenfilters corresponding to data samples from the respective microphones for noise only and signal only conditions.

Although the invention is described in the context of two microphones, which is the typical case, the invention is applicable to the case where there are more than two microphones.

An advantage of the embodiments of invention is that they consume very low MIPs, (around 3 MIPS, assuming 48000 sampling rate); also they can significantly reduce effective noise by more than 15 dB with minimum degradation and very low distortion of the input audio signal. In one embodiment, the method is based on TISO (two-input, single output) linear filtering of the two microphone signals.

Filter coefficients may be obtained by calculating eigenfilters corresponding to data samples for noise only and signal only recordings from the two microphones. The main assumption is that audio path between the noise source and the two microphone is not time varying, which is true e.g. for camera where location of zoom (or focus) motor with respect to the microphones on the camera is fixed.

Thus the invention relates to a method for reducing zoom or focus motor noise picked up by camera's microphones during video recording. Noise is reduced by digital processing of the outputs of the two microphones on the camera. The noise is reduced using an Eigenfiltering approach where the two microphone signals are combined through linear filters in such way to minimize the noise and maintain the desired output audio signal. These linear filters may be implemented as part of the firmware running on the camera's internal processor while the coefficients for these linear filters may be calculated offline in advance (e.g. on a PC) based on following steps.

1) Collect data from two microphones which contain only motor noise. We call this data set I
2) Collect data from two microphones which contain only input audio signal and does not contain motor noise. We can this data set II.
3) Calculate cross-covariance matrix of data set I, we call this matrix A
4) Calculate cross-covariance matrix of data set II, we call this matrix B.
5) Calculate generalized eigenvectors and eignvalues of matrices B and A.
6) Find the eigenvector corresponding to maximum eigenvalue.
7) Calculate first two filters coefficients based on values of eigenvector calculated in step 6 in this fashion that coefficients of first filter will be the first half values of eignevector and coefficients of second linear filter will be next half values of eigenvector.
8) Calculate inverse FIR filter of eigenvector calculated in step 6.
9) Filter signals of two microphones using the two FIR filters with coefficients obtained in Step 7 and add the outputs of two FIR filters together.

Pass the output of step 9 through the filter calculated in step 8.

Steps 1-8, for calculating filter coefficients, are typically done offline in advance. Steps 9 and 10 are done as part of firmware running on camera processor with the pre-calculated coefficients stored in memory in the camera.

According to a further aspect of the invention there is provided a noise reduction circuit comprising first and second linear filters for filtering input signals $x_1(t)$, $x_2(t)$ from respective microphones subject to a noise source that is in a fixed location relative to a pair of microphones; and wherein the first and second linear filters have filter coefficients obtained by computing eigenfilters corresponding to data samples from the respective microphones for noise only and signal only conditions.

It will be appreciated that the term "circuit" is used here in the widest sense and includes an all digital implementation in software and/or hardware.

BRIEF DESCRIPTION OF THE DRAWINGS

The invention will now be described in more detail, by way of example only, with reference to the accompanying drawings, in which:—

DETAILED DESCRIPTION OF THE INVENTION

The invention will be explained in detail using the following notation throughout the description:
t is the index to a sample.
$x_1(t)$ is the digitized signal from microphone M1.
$x_2(t)$ is the digitized signal from microphone M2.
$z_1(t)$ is the output of the first FIR filter with input $x_j(t)$.
$z_2(t)$ is the output of the second FIR filter with input $x_2(t)$.
$z(t)$ is the output summation of $z_1(t)$ and $z_2(t)$.
y(t) is the output of the third FIR filter with input $z(t)$.
$w_1(k)$ are the filter coefficients for the first FIR filter.
$w_2(k)$ are the filter coefficients for the second FIR filter.
$w_3(k)$ are the filter coefficients for the third FIR filter.

Figure 1:
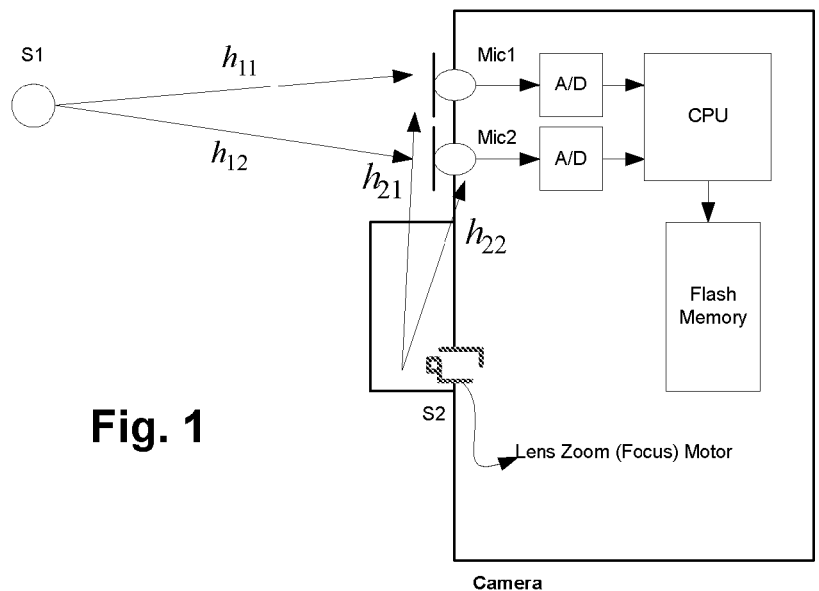
FIG. 1 is a high level block diagram of video camera with a potential motor noise problem.

Consider a video camera as shown in FIG. 1 and let $x_1(t)$ represent the output signal of microphone (M1) and $x_2(t)$ represent the output signal of microphone (M2). In this case, the following relationship holds:

$$\begin{bmatrix} x_1(t) \\ x_2(t) \end{bmatrix} = \begin{bmatrix} h_{11} & h_{12} \\ h_{21} & h_{22} \end{bmatrix} \begin{bmatrix} s_1(t) \\ s_2(t) \end{bmatrix} \quad (1)$$

where $S_1(t)$ represents the equivalent time domain signal of the subject which is the desired signal and $S_2(t)$ represents the time domain signal of the interference source (e.g. the motor noise in camera), $h_{11}$, $h_{12}$, $h_{21}$ and $h_{22}$ are the acoustic paths between the subject or interference source and the two microphones. $h_{11}$ and $h_{22}$ are assumed to be time invariant. This assumption is true for most cameras since the zoom motor location is fixed with respect to the microphones.

Figure 2:
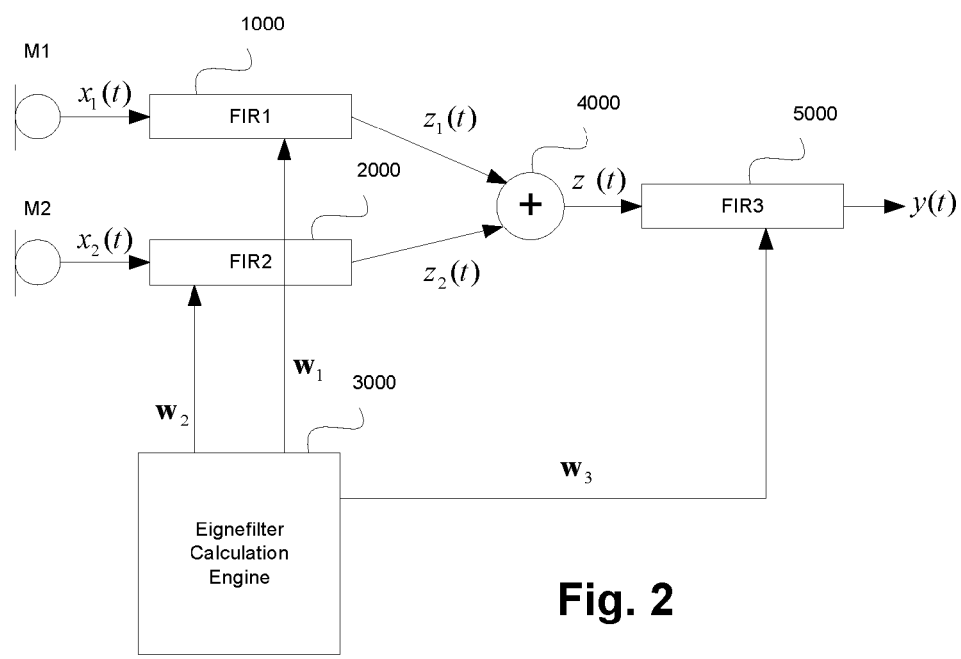
FIG. 2 is top-level block diagram of an embodiment of the invention.

FIG. 2 is a block diagram of an embodiment of the invention providing a noise reduction circuit. In this block diagram FIR filters 1000 and 2000 are linear with their outputs computed based on following equation:

$$z_i(t) = \sum_{l=0}^{L-1} w_i(l) x_i(t-l) \quad i = 1, 2 \quad (2)$$

where L is the order of the filter and $w_i(l)$ is the $l^{th}$ coefficient of the FIR filter coefficient vector $w_i$.

A third FIR filter 5000 with size 2 L is used to equalize magnitude and phase of z(t), which I sthe summed output of filters FIR1 and FIR2.

Embodimentz of this invention find filter coefficients $w_i(l)$, $w_2(l)$, and $w_3(l)$ in a way that minimizes the motor noise while maintaining original audio quality. To achieve this following procedure is followed:

First, FIR coefficient vectors $w_1$ and $w_2$ are calculated using block 3000 to solve the following optimization problem:

$$\underset{w}{\text{Max}} \; \frac{P_{S_1}(w)}{P_{S_2}(w)} \quad (3)$$

where $w=[w_1 w_2]$ is a row vector of size 2 L×1, $P_{s1}(w)$ is the output signal power when only subject signal ($S_1(t)$) is active and noise ($S_2(t)$) is zero, $P_{s2}(w)$ is the output signal where only noise is active and subject signal is zero.

The solution to the above equation is a set of filter coefficients $w_1$ and $w_2$ that maximizes the above equation.

To solve this optimization problem we have $$P_{s_1}(w) = w R_{S1} w^T \quad (4)$$

and $$P_{s_2}(w) = w R_{S2} w^T \quad (5)$$

where $$R_{S_1} = \begin{bmatrix} R_{x_1 x_1} & R_{x_1 x_2} \\ R_{x_2 x_1} & R_{x_2 x_2} \end{bmatrix} \text{ with } S_2(t) = 0 \quad (6)$$

and $$R_{S_2} = \begin{bmatrix} R_{x_1 x_1} & R_{x_1 x_2} \\ R_{x_2 x_1} & R_{x_2 x_2} \end{bmatrix} \text{ with } S_1(t) = 0 \quad (7)$$

$R_{x_i x_j}$ the covariance matrix of microphone signals $x_i(t)$ and $x_j(t)$ and is given by $$R_{x_1 x_2} = \begin{bmatrix} r_{x_i x_j}(0) & r_{x_i x_j}(1) & \ldots & r_{x_i x_j}(L-1) \\ r_{x_i x_j}(-1) & r_{x_i x_j}(0) & \ldots & r_{x_i x_j}(L-2) \\ \ldots & \ldots & \ldots & \ldots \\ r_{x_i x_j}(-L+1) & \ldots & \ldots & r_{x_i x_j}(0) \end{bmatrix} \quad (8)$$

with $r_{x_i x_j}(l) = E[x_i(t) x_j(t+l)]$ being the cross correlation function of two microphone signals $x_i(t)$ and $x_j(t)$. When i=j this becomes the autocorrelation function of each microphone signal and E[.] is the expectation function. In practice this correlation function can be estimated using following estimator $$\hat{r}_{x_i x_j}(l) = \frac{1}{N} \sum_{t=o}^{N-1} x_i(t) x_j(t+l) \text{ with } i = 1, 2, j = 1, 2 \quad (9)$$

substituting Equ. 4 and Equ. 5 into Equ. 3 we will get $$\underset{w}{\text{Max}} \frac{w R_{S_1} w^T}{w R_{S_2} w^T} \quad (10)$$

The solution to this optimization problem can be found by solving following generalized eigenvalue problem $$R_{S_1} w_s = \lambda_{max} R_{S_2} w_s \quad (11)$$

where $\lambda_{max}$ is maximum generalized eigenvalue of two matrices $R_{S_1}$ and $R_{S_2}$ and, which is the solution to optimization problem in Equ. (10), is the corresponding eigenvector.

The eigenvector obtained in the above contains the coefficients for FIR1 and FIR2 filters. By applying these two filters to the microphone signals we can reduce the noise but original audio quality may change due to filtering effect of FIR1 and FIR2. To compensate for this filtering effect one way is to add a constraint on w in Equ. (10) to be an allpass filter. An other approach is to equalize the output using a third FIR filter as shown in FIG. 2. Coefficients for this third FIR filter can be obtained by approximating the FIR inverse of the eigenvector $w_s$.

Figure 3:
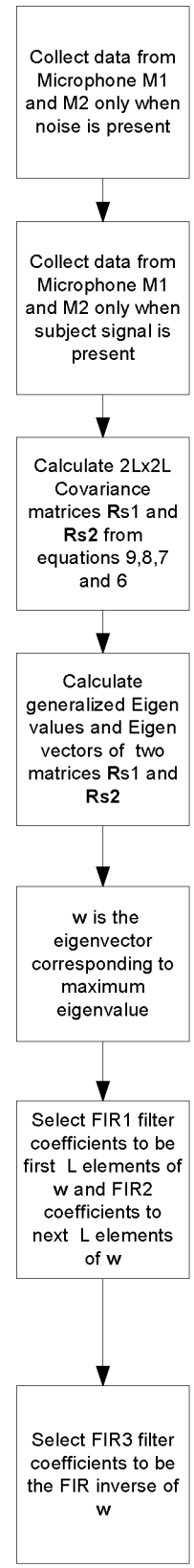
FIG. 3 is a flow chart illustrating the calculation of the filter coefficients.

FIG. 3 shows the flow chart for calculating two FIR filters coefficients. In a first step 30, data is collected from microphones M1 and M2 when only noise is present. In a second step 31 data is collected from microphones M1 and M2 when only the subject signal is present. In a third step 32, the covariance matrices $R_{s1}$ and $R_{s2}$ are computed from equations 9, 8, 7, and 6. In a fourth step 33, the eigenvalues and eigenvectors of the two matrices $R_{s1}$ and $R_{s2}$ are calculated. In a fifth step 34 the eigenvector w corresponding to the maximum value is found. In a sixth step 35, the FIR first L elements of w are allocated to the first FIR filter as filter coefficients and the second L elements of w are allocated to the second FIR filter as filter coefficients.

In final step 36, the filter coefficients of the third FIR filter as allocated as the inverse of w.

In practice Equ. (3) through Equ. (11) (for calculating filter coefficients) and including calculating the FIR inverse can be done off line (e.g. on a PC platform) and the results stored in a memory in the camera. Once the coefficients have been calculated, real time requirements are limited to simply running three FIR filters camera processor.

Embodiments of the invention thus offer a new method for reducing camera lens' zoom and focus noise using two microphones with very low computational complexity and efficient reduction of motor noise without distortion of the original audio signal.

Among the advantages of the embodiments of the proposed method compared to the prior art are the fact that it does not require any knowledge of motor noise or microphones locations, does not make any assumption on geometry of microphone (e.g. distance between microphone, linear array of microphones etc.), is capable of a more than 15 dB of noise reduction, operates at very low MIPs and is very simple to implement, and it reduces noise without distorting desired audio signal.

It should be appreciated by those skilled in the art that any block diagrams herein represent conceptual views of illustrative circuitry embodying the principles of the invention. For example, a processor may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. The term circuit is used herein to encompass functional blocks that may in practice be implemented in software.

The invention claimed is:

1. A method of reducing noise in an environment where the noise source is in a fixed location relative to a pair of microphones, comprising:
receiving signals $x_1(t)$, $x_2(t)$ from the respective microphones; and
filtering each of the signals $x_1(t)$, $x_2(t)$ with respective first and second linear filters having filter coefficients obtained by:
computing the cross-covariance matrices A and B of data sets from the respective microphones for noise only and signal only conditions,
computing the generalized eigenvectors and eigenvalues of the matrices A and B,
finding a specific eigenvector corresponding to the maximum eigenvalue of said generalized eigenvalues, and
calculating the filter coefficients from said specific eigenvector; and
outputting a noise-reduced filtered output signal to an audio processor.

2. A method as claimed in claim 1, wherein the linear filters are Finite Impulse response filters.

3. A method as claimed in claim 1, wherein the filtered signals are summed and passed through an inverse linear filter.

4. A method as claimed in claim 1, wherein the coefficients of the first linear filter are the first half values of said specific eigenvector and the coefficients of the second linear filter are the second half values of said specific eigenvector.

5. A method as claimed in claim 4, wherein the filtered signals are summed and passed through an inverse linear filter and the inverse linear filter is the inverse of said specific eigenvector.

6. A method as claimed in claim 1, wherein the noise is zoom motor noise in a video camera.

7. A noise reduction circuit comprising:

first and second linear filters for filtering input signals x1(t), x2(t) from respective microphones subject to a noise source that is in a fixed location relative to a pair of microphones; and an audio processor configured to receive noise-reduced filtered signals from said first and second linear filters; and and wherein the first and second linear filters have filter coefficients obtained by:

computing the cross-covariance matrices A and B of data sets from the respective microphones for noise only and signal only conditions, computing the generalized eigenvectors and eigenvalues of the matrices A and B, finding a specific eigenvector corresponding to the maximum eigenvalue, and calculating the filter coefficients from said specific eigenvector.

8. A noise reduction circuit as claimed in claim 7, wherein the linear filters are Finite Impulse response filters.

9. A noise reduction circuit as claimed in claim 7, further comprising a summer for summing the filtered signals, an inverse linear filter for inverse filtering the summed filtered signals to provide a noise reduced output signal.

10. A noise reduction circuit as claimed in claim 7, wherein the coefficients of the first linear filter are the first half values of said specific eigenvector and the coefficients of the second linear filter are the second half values of said specific eigenvector.

11. A noise reduction circuit as claimed in claim 10, further comprising a summer for summing the filtered signals, an inverse linear filter for inverse filtering the summed filtered signals to provide a noise reduced output signal and wherein the inverse linear filter is the inverse of said specific eigenvector.

12. A camera including noise reduction circuit as claimed in claim 7 to reduce motor noise.

* * * * *